May 3, 1927.                    1,626,851
H. DE F. MADDEN ET AL
GLASS ROD CUTTING MACHINE
Filed Jan. 2, 1922          2 Sheets-Sheet 1
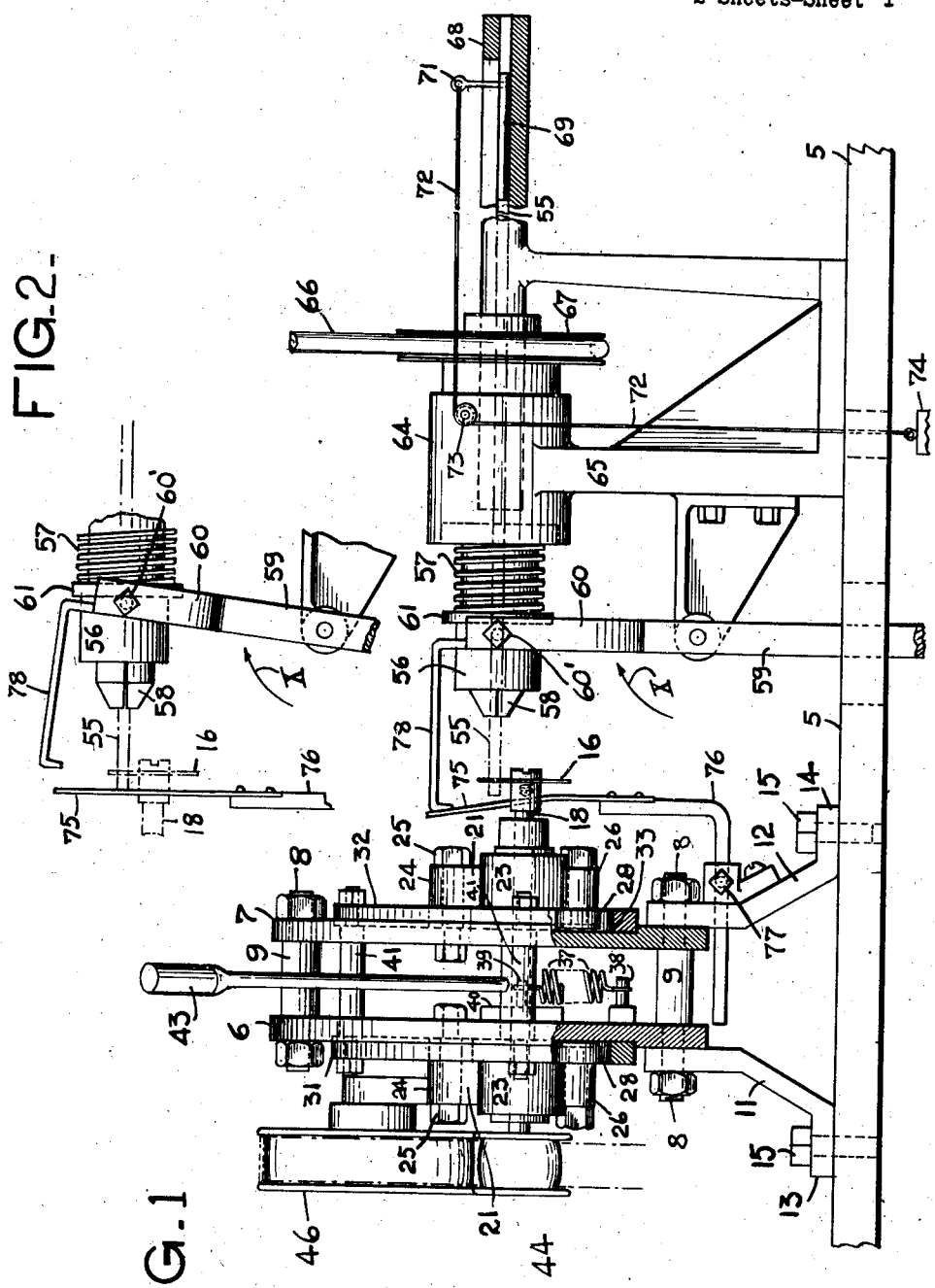
INVENTORS
HARRY D. MADDEN.
JOHN J. HIGGINS.
BY
ATTORNEY May 3, 1927.
H. DE F. MADDEN ET AL
1,626,851
GLASS ROD CUTTING MACHINE
Filed Jan. 2, 1922    2 Sheets-Sheet 2
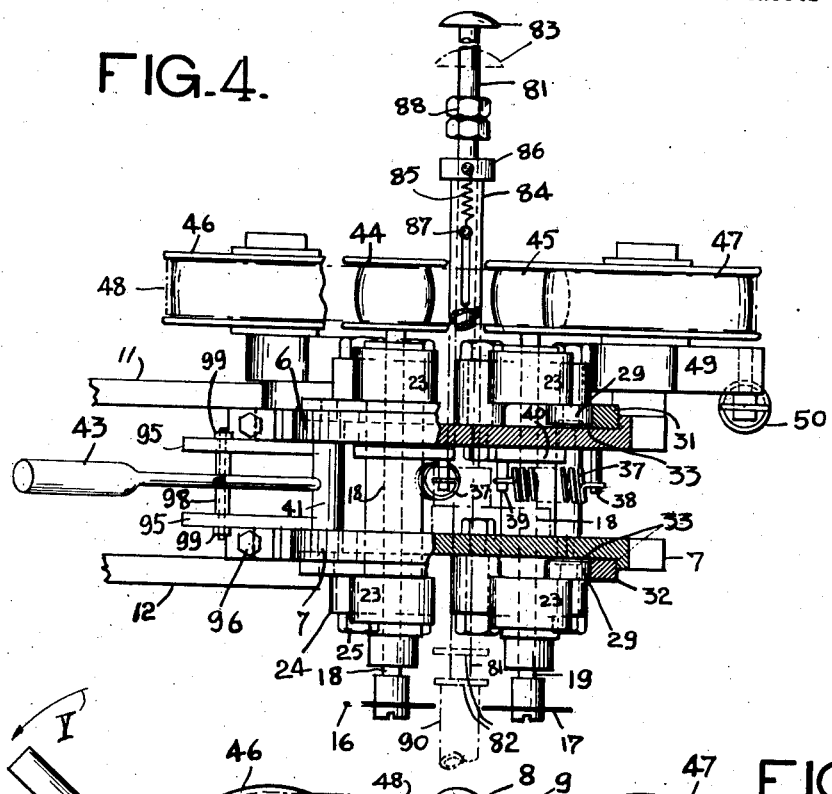
FIG. 4.
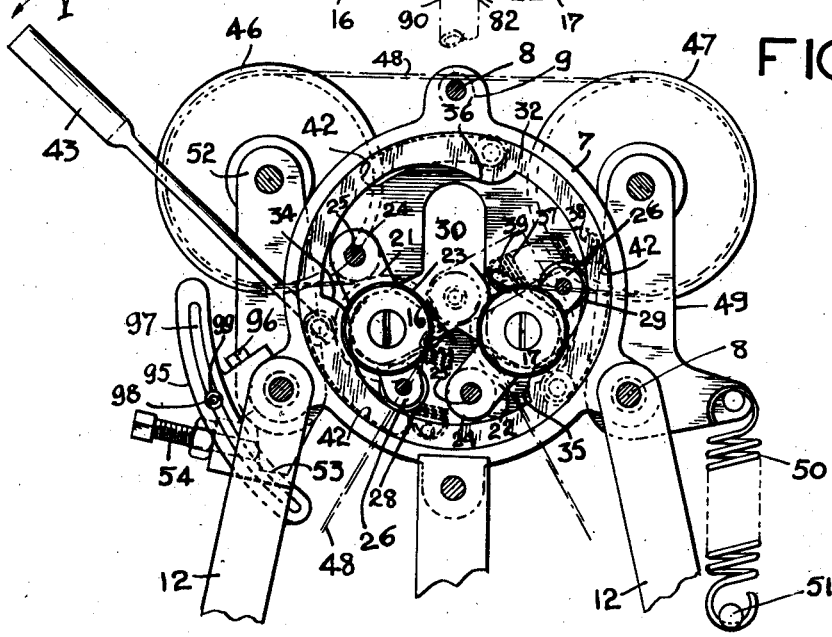
FIG. 3.
INVENTORS
HARRY D. MADDEN.
JOHN J. HIGGINS.
BY
ATTORNEY Patented May 3, 1927.

1,626,851

UNITED STATES PATENT OFFICE.

HARRY DE FOREST MADDEN, OF NEWARK, AND JOHN JOSEPH HIGGINS, OF EAST ORANGE, NEW JERSEY, ASSIGNORS TO WESTINGHOUSE LAMP COMPANY, A CORPORATION OF PENNSYLVANIA.

GLASS-ROD-CUTTING MACHINE.

Application filed January 2, 1922. Serial No. 526,452.

This invention relates to machines for and methods of cutting glass bodies into sections and relates more particularly to machines for cutting glass tubing or rods into given lengths for use in the manufacture of lamp parts, for instance, the component parts which constitute the stem of an incandescent electric lamp.

An object of the invention is to provide a method for severing glass rods or tubing into predetermined lengths by a combined abrasive and heat-generating action.

Another object is to provide a machine for severing bodies in an accurate and expeditious manner.

A further object is to provide a machine in which abrasion members may be moved in contact with a tube or rod with a given degree of pressure to cause sufficient friction to generate an amount of heat which, co-acting with an abrasion produced, will effect a parting of the rod on a line transverse to its axis.

A further object is to provide a machine of the above specified character with means for varying the pressure exerted upon the rod by the abrasion members to accommodate rods having different degrees of hardness.

In the manufacture of incandescent electric lamps, great precision is required in the dimensions of the several parts constituting the stem because automatic stem-making machines are now employed for consolidating these component parts.

The stems of incandescent electric lamps are utilized for carrying the leading-in wires and the filament and include several parts which, when in their blank state, consist of comparatively short lengths of tubing and rods.

By reason of the degree of manufacturing accuracy required, it is necessary to cut the tubes or rods into lengths having the edges of their walls in planes parallel to each other and at right angles to their axes and free from serrations or other irregularities.

Glass rods have commonly been severed by the method of scratching or nicking their surfaces and subsequently cracking them by the application of a force which produces tensional strains at the nicks. When severing rods by hand, this method has been found effective and has also produced fair results when employed in co-operation with automatic mechanism. However, this method results in the production of sections of rods having ends which are comparatively irregular. Furthermore, it has also been found that, by nicking and breaking rods, it is not possible to uniformly maintain the dividing break between two sections in a plane at right angles to the longitudinal axis of the rod.

The present invention avoids the above mentioned disadvantages by providing a mechanism for abrading or grooving a rod in a given plane so that heat is generated within the rod at a rate greater than that at which it is dissipated, thus resulting in the quick expansion of the glass and a consequent parting of the rod. Because of the generation of the heat by the abrading means, the former travels through the material radially and, after a sufficient accumulation thereof has been effected, it, in combination with the abrasion, will produce a clean break in the rod in a plane perpendicular to the rod axis.

It is to be understood that this invention is applicable for the severance of tubes, cane or rods and that the word rod, when used herein, may be construed as indicating either a solid or a hollow rod.

The present invention will be understood in connection with the accompanying drawings which illustrate one embodiment of the invention and in which, Fig. 1 is a side view, in elevation, of the tube-cutting machine;

Fig. 2 is a detail showing the rod-gripping chuck in an open position;

Fig. 3 is a front view, in elevation, of the machine with the rod-gripping chuck and other parts removed; and Fig. 4 is a plan view of the mechanism shown in Fig. 3, partly in section.

The present embodiment of the invention employs one or more abrasion members adapted to be moved toward a common point. Means are provided for supporting a rod and positioning it with its axis coincident with a line passing through the said point and transverse to the plane in which the abrasion members rotate. The abrasion members or cutters may then be moved toward the rod to cause an abrasion of the surface thereof, means being preferably provided for rotating the rod during the abrading operation.

Referring to Fig. 1, it will be seen that the machine for practicing the invention may be of a semi-automatic type supported on any suitable table or bench 5 and may include a pair of plates 6 and 7 secured together by bolts 8 and spaced apart by sections of tubing or separators 9 placed over the bolts 8. The plates 6 and 7 are elevated above the table 5 by means of legs 11 and 12 provided with feet 13 and 14 secured to the table by tap-bolts 15.

The plates 6 and 7 serve to carry one or more abrasion or cutting wheels 16 and 17 (Fig. 3). These wheels may be of any suitable material, as for instance, carborundum or steel, and one or more of such wheels may be employed. The present embodiment of the invention provides for the employment of three wheels, the drawings, however, illustrating but two wheels or abrasion members 16 and 17. These members are secured to shafts 18 and 19 mounted on arms 21 and 22, one arm of each pair being pivotally mounted on the plate 6 and the other on the plate 7, and the arms are provided with enlarged portions 23 that constitute bearings for the shafts. Corresponding ends 24 of the arms 21 and 22 are pivoted to the plates 6 and 7, respectively by bolts 25, the opposite corresponding ends 26 of the arms 21 and 22 being equipped with rollers 28 and 29, respectively. The plates 6 and 7 are provided with trident-shaped apertures 30 to permit lateral movement of the shafts 18 and 19. When desired, another shaft with its cutter (not shown) may be added. It will be evident that the shafts 18 and 19, and, consequently, the cutters 16 and 17, may be moved in an arc about the bolts 25 and toward a common point or toward the work and, for this purpose, annular cam-members 31 and 32 are oscillatably positioned in recesses 33 in the respective plates 6 and 7. The inner surface of each cam-member is provided with suitably disposed raised cam faces 34, 35 and 36 adapted to engage simultaneously with the rollers 28 and 29 and the roller of an additional cutter, when added. The rollers 28 on the arms 21 are normally held in contact with the inner surfaces of the cam-members 31 and 32 by a spring 37 (see Fig. 1) secured to a pin 38 fastened to the plate 6 and to a pin 39 secured to a finger or projection 40 fastened to the bearing 23 of the arm 22, and the rollers 29 on the arms 22 are held in contact with the inner surfaces of the cam-members in like manner.

The cam-members 31 and 32, positioned in the plates 6 and 7, are connected by bars 41, the ends of the bars being attached to the cam-members. Suitable slots 42 are provided in the plates 6 and 7 to permit movement of the bars 41 when the cam-members are oscillated by means of a lever 43 positioned intermediate the plates and secured to one of the bars 41.

When the cam-members 31 and 32 are oscillated by a movement of the lever 43, the raised portions 34 and 35 make contact with the rollers 28 and 29, respectively, and thus the shafts may be positively moved to gradually bring the cutters into frictional engagement with the work.

The shafts 18 and 19 are provided with pulleys 44 and 45, respectively, and adjacent each of said pulleys are positioned resiliently mounted idlers 46 and 47, respectively. The shafts and, consequently, the cutters 16 and 17, may be driven by any suitable means, as, for instance, by a motor, (not shown) in which case an endless belt 48 is passed over the driving pulley of the motor and over the pulleys 44 and 45 and around the idler pulleys 46 and 47. In order to maintain the required tension of the belt 48 upon the pulleys 44 and 45 during their movement with the shafts 18 and 19, the idler 47 is mounted on a bell-crank 49. The bell-crank is pivoted on the bolt 8 and has one arm connected to one end of a spring 50, the opposite end of the spring being secured to a pin 51 which is mounted in any suitable portion of the stationary structure of the machine.

The idler 46 is carried on a pivotally mounted lever 52 having a projecting lug 53 that abuts against a set screw 54, positioned in a projection integral with a leg 12. By an adjustment of the set screw 54, the angular position of the lever 52 may be changed and the tension of the belt 48 be thus varied.

Figs. 1 and 2 show the machine as used for severing a comparatively small-diameter rod 55, indicated in dotted lines. When fed to the cutters, the rod is passed through a floating chuck having a sleeve 56 adapted to normally close jaws 58 through the action of a spring 57; the sleeve being provided with an inner conical surface common to this type of chuck, and a rod positioned in the chuck is thus secured for rotation with the chuck.

When it is desired to move a rod toward the cutters a foot treadle may be provided and actuated to rock a lever 59 which is provided with off-set portions or tines 60 equipped with pins or screws 60' to engage a collar 61 on the sleeve 56. A movement of the lever 59 in the direction of the arrow "X" causes the sleeve 56 to move in opposition to the spring 57 to permit the jaws 58 to open. Thus, after the cutters have operated to sever a portion of the rod and the treadle is actuated to open the jaws 58, the rod may be moved to a new position by mechanism to be described hereinafter. The treadle may then be released, thus permitting the jaws to close and grip the rod, after which the cutters are again actuated.

For the purpose of abrading or grooving the rod circumferentially, this embodiment of the invention employs mechanism for rotating the rod continuously and means for pressing the cutters into contact therewith. The rotation of the rod is accomplished by supporting the chuck rotatably in a suitable bearing 64 carried on a bracket 65 rigidly secured to the table 5. The chuck may be continuously driven in any suitable manner, as, for instance, by a motor (not shown) connected by a belt 66 to a sheave 67, secured to the shank of the chuck, and the cutters are pressed against the rod by actuation of the hand lever 43.

The rod 55 may be fed to the cutters by hand, or by an automatic device comprising a slotted tube 68 in which is disposed a slidable rod or plunger 69 provided with an upright pin 71 to which one end of a cable 72 is fastened. The cable may then be passed over a guide pulley 73 and have a weight 74 attached to its other end. Thus, the potential energy of the weight serves to normally urge the plunger 69 toward the cutters 16 and 17 and move the rod 55, disposed in the path of the plunger, toward the cutters each time the treadle is depressed and the jaws 58 are actuated to release the rod.

A resilient member 75 serves to stop the movement of the rod or tube and automatically position it for the cutting operation. The member 75 is carried on a slidable support 76 which may be adjusted to a given position and retained in such position by a set screw 77. By this means, the rod or tube to be cut may be stopped in any predetermined position for the severing operation.

In order to prevent the stop member 75 from continual engagement with the rod during the cutting operation, means are provided for removing the member, as shown in Fig. 2. This removal of the member 75 is accomplished by the provision of a finger 78 secured to the upper end of the lever 59. It will be understood that, when the treadle is depressed and the jaws 58 of the chuck release the rod, the finger 78 will be removed from contact with the member 75, however, when the treadle is released, the finger moves toward the member 75 and makes contact therewith to remove it from engagement with the rotating rod.

Another construction of a stop device, which is preferable when cutting large-diameter tubes, is shown partly in dotted lines in Fig. 4. This device comprises a push-rod 81 having a stop plate 82 at one end and a knob or button 83 at the other end to afford a hand hold for an operator. The push-rod is movably disposed in a tube 84 which latter is secured to the inner side of the plate 7. The push-rod may be maintained in its retracted position by means of a spring 85 secured to a collar 86 on the tube 84 and to a pin 87 extending through a slot in the tube and fastened to the push-rod 81. Lock nuts 88 are provided for adjustment of the inward movement of the push-rod 81. Thus, when a new section of tube is to be severed, the operator moves the rod 81 until the lock nuts 88 engage the collar 86, and a tube or rod 90 (shown in dotted lines) is moved into engagement with the plate 82, thereby positioning the tube for severance. The push-rod 81 is then released, and the spring 85 causes a removal of the plate 82 from proximity to the cutters to avoid any contact between the stop plate 82 and the tube during the cutting operation. In practice, the cutters 16 and 17 may be continually rotated as well as the chuck which carries the jaws 58, and it will be evident that, since the chuck and the cutters are driven by independent means, their relative speeds may be varied. It has been found that good results are obtained by rotating the cutters at a high speed and the chuck and rod or tube at a comparatively low speed.

When the machine is operated in practice and it is desirable to cut off short pieces of a rod, the stop device, as shown in Figs. 1 and 2, is employed and a length of rod is inserted in the tube 68 between the plunger 69 and the chuck, the jaws of which are normally closed to prevent movement of the rod toward the cutters. The plunger, however, urges the rod toward the stop member 75 and, when the treadle is actuated to cause an opening of the jaws 58, the rod is moved forward until arrested by the stop member 75 which has been so adjusted that a given length of rod will project beyond the cutting edges. When the treadle is released and the jaws 58 grip the rod, the finger 78 engages the member 75 and moves it from proximity to the cutters and from contact with the rod; the finger being positioned to engage the member 75 just after the jaws 58 have closed. The lever 43 is then moved in the direction of the arrow "Y" (Fig. 3), thereby effecting a rotative movement of the cam-members 31 and 32 to cause the rollers 28 and 29 to traverse the cam faces 34 and 35 and rock the arms 21 and 22 which carry the shafts 18 and 19 and, consequently, to bring the cutters 16 and 17 into operative engagement with the rod. The cutters may, therefore, by means of a manipulation of the lever 43, be gradually pressed upon the rod until the abrasion produced and heat generated during the abrasion causes a parting of that portion of the rod which is positioned between the cutters and the stop member 75. When a section of the rod has been removed, the lever 43 is moved in a return path until the arms 21 and 22 assume their normal positions, under the action of springs 37.

The same operations are performed when a tube of larger diameter is to be severed as, for instance, the tube 90 in Figs. 3 and 4, in which case, the tube is moved until its end engages the stop plate 82 of the rod 81 which is moved toward the cutters to a temporary position by the operator (as shown in dotted lines). When the tube 90 is in position and has been gripped by the jaws 58 of the chuck, the operator permits the rod 81 to move, under the action of spring 85, from contact with the tube.

It is obvious that a glass rod may possess variable properties, as, for example, one glass may be soft and another hard, thereby necessitating a very slight scoring or abrasion for one kind and a relatively deep groove for another. It is therefore an advantage to be able to exert a given amount of pressure between the abrasion members and the work, thus making it possible to vary the frictional contact and, consequently, the degree of heat generated during the severing operation. If a quantity of hard glass is to be severed, the operator may first actuate the cutters to sever several pieces and thus determine the depth of the cut or abrasion necessary and the pressure required to cause the rod to part. When cutting an exceptionally hard glass, as, for instance, a boro-silicate glass, the operator exerts a certain degree of pressure upon the lever to produce the required amount of friction and an abrasion of a certain depth, the heat produced by the friction co-acting with the abrasion, which latter weakens the rod to effect separation of a given section from the rod. Glass of a softer character may be severed by a comparatively slight abrasion which, when combined with the heat generated during the abrasion, will cause a parting of the rod.

It has, in practice, been observed that as the opposed cutting members are gradually pressed toward the axis of the tube and the tube is grooved, the cutters serve to perform the action of a wedge and thus aid in detaching one portion of the tube from the other.

When desirable, an attachment may be added to the machine by means of which the downward or operating stroke of the lever 43 may be limited. One such mechanism is shown in Figs. 3 and 4 of the drawing and comprises a bracket 95 secured to the body of the machine by bolts 96. Each bracket is provided with a slot 97 in which a cross-bar 98 is movably positioned and adapted to be secured by means of nuts 99 in any given position to vary the limit of movement of the lever in accordance with the desired degree of movement of the cam-members 31 and 32, as may be determined by experiment or otherwise.

It will be understood that this invention may be embodied in many other forms than that shown and described, and it is, therefore, intended to cover, by the appended claims, all changes and modifications which come within their scope.

What is claimed is:

1. A machine for severing glass rods comprising a rotary abrasion member, a holder for rotatably supporting a rod and means for bringing said member and said rod in frictional contact to produce a peripheral groove upon the rod to partially sever the same, said means being operable to effect a gradually increasing frictional engagement between the member and rod to generate heat at the base of the groove and cause a severing operation.

2. A machine for severing glass tubular bodies comprising a cutter member, a support for a rod, means for rotating the rod about its longitudinal axis, an actuating member for pressing said cutter and said rod into engagement and means associated with said actuating member for effecting an increase or decrease in pressure upon said rod to produce a groove therein of a predetermined depth during a given movement of said actuating member.

3. A machine for severing glass rods comprising a cutter, means for rotating a rod about its longitudinal axis, an actuating member for effecting a contact between said rotating rod and said cutter to produce a circumferential incision upon said rod and means associated with said actuating member for changing the degree of pressure between said rod and said cutter upon a movement of said actuating member through a given distance.

4. A machine for severing glass rods comprising a cutter, a holder for supporting a rod, a lever for pressing said cutter and said rod in contact to cause a circumferential incision upon said rod and means associated with said cutter for gradually and mechanically increasing the degree of pressure between said rod and said cutter during a predetermined movement of said lever.

5. A machine for severing glass rods comprising a rotatable cutter, a holder for supporting a rod, means for rotating said rod, an actuating lever for bringing said cutter and said rod into frictional contact to produce a circumferential incision upon the rod and mechanical means cooperating with said lever for increasing the frictional contact between said cutter and said rod to cause a generation of heat within said rod to sever the same during a movement of said lever through a given distance.

6. A machine for severing glass rods comprising a resilient support, a rotatable cutter member, a rotatable holder for supporting a rod, and actuating lever for moving said cutter in contact with said rod, means for rotating said holder to cause a peripheral incision on a rod held therein and means intermediate the lever and said cutter to effect a uniform increase of pressure between said cutter and rod upon a given movement of said lever.

7. A machine for severing glass rods comprising a pair of cutters, a holder for supporting a rod, means for moving said cutters in opposite directions, an actuating lever for bringing said cutters and said rod into engagement to produce a circumferential incision upon said rod and means associated with said lever for causing a uniform increase in pressure between the cutters and the rod.

8. A machine for severing glass rods comprising resiliently supported rotary cutters, a rotatable holder for supporting a rod, means movable about a rod for moving said cutters into engagement with the rod to cause a peripheral incision therein to sever the rod and means operating in conjunction with said last mentioned means for causing a gradual increase of pressure between said cutters and said rod.

9. A machine for severing a glass rod comprising resiliently supported cutters, a holder for rotatably supporting a rod, a cam member rotatable about the longitudinal axis of said rod and disposed to move said cutters against said rod and a lever member for actuating said cam to cause a gradual increase of pressure between said cutters and said rod during the cutting operation.

10. A machine for severing a glass tubular body comprising a pair of rotatable shafts, a cutting wheel mounted on each of said shafts, means for driving the shafts, means for supporting a rod in operative relation to said cutting wheels, means for rotating said rod, an annular cam member disposed around said cutters and having cam surfaces adapted to move the cutters against a rod and means for causing a rotary movement of said cam member to press the cutters against the rod to produce an incision and sever the same.

11. A machine for severing a glass rod comprising a pair of oscillatory arms, shafts carried by said arms, a plurality of cutters rotatable with said shafts, an annular cam member having cam surfaces adapted to engage and move said arms, means for supporting a rod in operative relation to said cutting members, means for actuating said cam to change the relative positions of said cutters to cause a contact between said cutters and said rods and means for limiting the movement of said cam members whereby an incision of a predetermined depth may be produced on said rod.

12. A machine for severing a glass rod comprising oscillatory arms, a shaft carried by each of said arms, a cutter rotatable with each of said shafts, a circular cam ring having internal cam surfaces to engage and move said arms, means for supporting a rod in operative relation to said cutters, means for actuating said cam ring to move said cutters and cause a contact between the same and said rod and means for limiting the movement of said cam member to produce a groove of a predetermined depth in said rod.

13. A machine for severing a glass rod comprising a cutter, means for rotating the rod, means for rotating the cutter and means associated with said cutter to effect a movement of the same in contact with the rod to produce a peripheral groove, partly severing the rod, said last mentioned means operating to increase the degree of contact between the cutter and rod during the cutting operation, whereby heat is generated sufficient to cause a quick expansion of the material at the base of the groove and sever the rod.

14. A machine for severing a glass rod comprising a pair of cutters, means for rotating the rod, means for rotating the cutters and means for changing the relative positions of said cutters and rod to bring the cutters in contact with the rod, said last mentioned means operating to gradually increase the degree of contact between the cutters and rod to produce a peripheral groove partly severing the rod, the gradual increase in the degree of contact effecting a generation of heat at the base of the groove causing a complete division of the rod.

In testimony whereof, we have hereunto subscribed our names this 30th day of December, 1921.

HARRY DE FOREST MADDEN.
JOHN JOSEPH HIGGINS.